United States Patent [19]
Langley

[11] 3,859,984
[45] Jan. 14, 1975

[54] ULTRASONIC TRANSDUCER FOR FETAL MONITORING

[75] Inventor: Lawrence W. Langley, Ellwood City, Pa.

[73] Assignee: Corometrics Medical Systems, Inc., Wallingford, Conn.

[22] Filed: Aug. 14, 1972

[21] Appl. No.: 280,571

[52] U.S. Cl................ 128/2.05 Z, 310/8.6, 310/9.1, 73/67.7
[51] Int. Cl................................................. A61b 5/02
[58] Field of Search.......... 128/2.05 R, 2 V, 2.05 Z, 128/2.05 S, 24 A, 205 P; 310/8.3, 8.6, 8.7, 9, 9.1, 9.6; 73/67.5, 67.6, 67.7, 67.8, 194 A; 340/10

[56] References Cited
UNITED STATES PATENTS

| | | | |
|---|---|---|---|
| 2,748,369 | 5/1956 | Smyth | 310/9.6 X |
| 3,237,623 | 3/1966 | Gordon | 128/24 A |
| 3,239,696 | 3/1966 | Burkhalter | 310/83. X |
| 3,379,901 | 4/1968 | Richards | 310/9 X |
| 3,387,149 | 6/1968 | Young | 310/9.1 |
| 3,396,287 | 8/1968 | Horton | 310/9.1 |
| 3,561,430 | 2/1971 | Filler | 128/2.05 |
| 3,573,394 | 4/1971 | Birnbaum | 128/2.05 S |
| 3,587,561 | 6/1971 | Ziedonis | 128/2.05 |
| 3,676,584 | 7/1972 | Plakas | 128/24 A |
| 3,780,725 | 6/1973 | Goldberg | 128/2.05 Z |

FOREIGN PATENTS OR APPLICATIONS

| | | | |
|---|---|---|---|
| 659,455 | 10/1951 | Great Britain | 310/8.7 |
| 1,574,194 | 7/1969 | France | 128/2 V |

OTHER PUBLICATIONS
Robert Rushner, "Medical Instrumentation", Medical-Surgical Review, 1969.

*Primary Examiner*—Richard A. Gaudet
*Assistant Examiner*—Lee S. Cohen
*Attorney, Agent, or Firm*—DeLio and Mongtomery

[57] ABSTRACT

This disclosure relates to an ultrasonic transducer for monitoring fetal heartbeat using two sets of transmitting and receiving crystals each set having a different focal point to establish a zone or area in which the fetal heart will reside.

7 Claims, 8 Drawing Figures

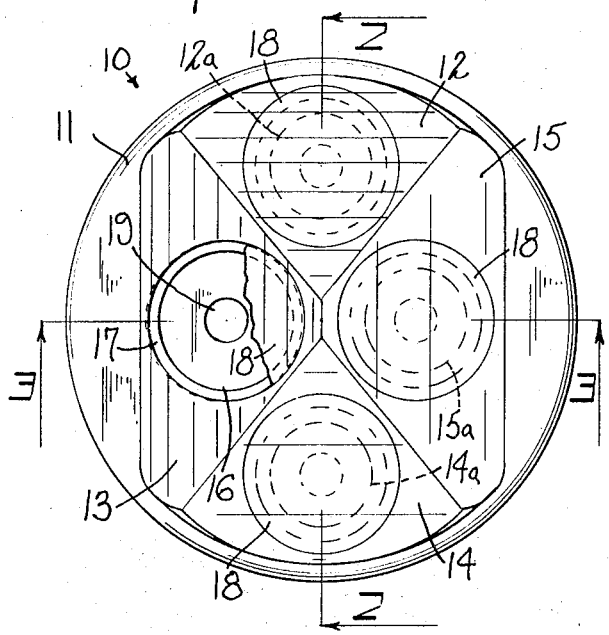
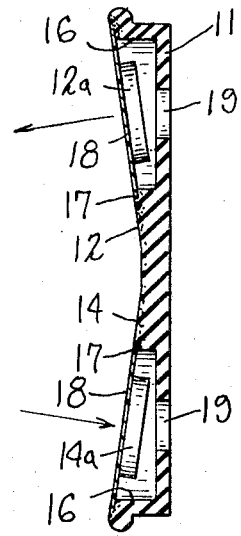
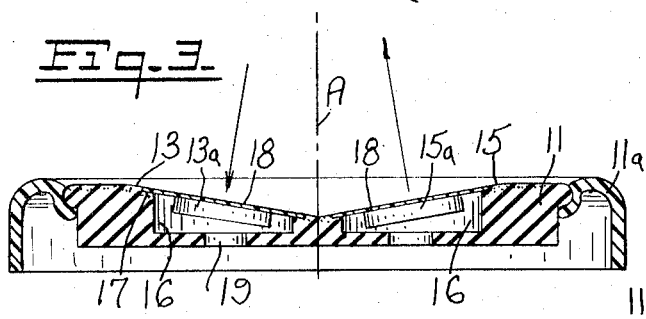
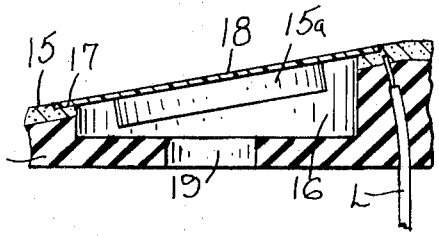
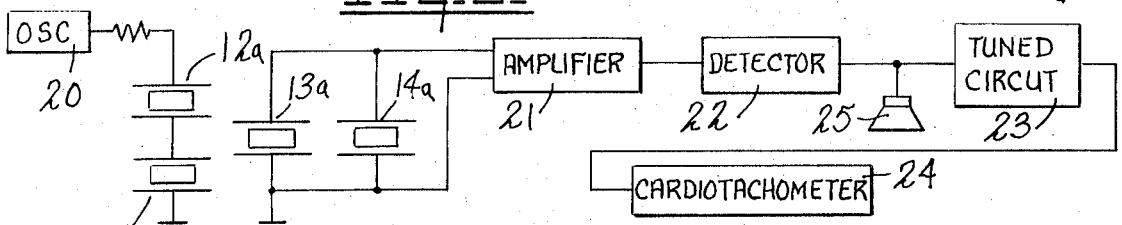
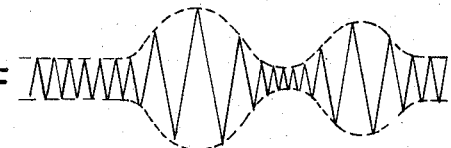
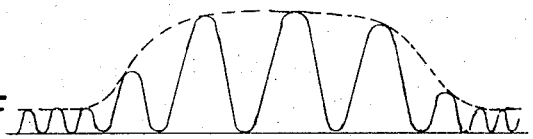

ULTRASONIC TRANSDUCER FOR FETAL MONITORING

This invention relates to transducers, and more particularly relates to ultrasonic transducers utilized for fetal monitoring.

In recent years it has been recognized that the condition of a fetus may be monitored by detecting the heartrate thereof, particularly in relation to uterine contractions. The correlation of signals indicative of these occurrences provides an indication of the existence of any distress of the fetus. For the most accurate detection of these conditions, the heartbeat of the fetus is obtained by a direct electrode connection thereto and the intrauterine pressure is generally moinitored by a catheter which is liquid-coupled from the uterus to a pressure-sensitive device. However, such direct connections to the fetus commit the physician to delivery.

for initial screening or monitoring purposes, ultrasonic transducers operating on the Doppler principle have been devised. Such transducers attempt to direct ultrasonic energy into the abdomen and detect the phase shift in the relected wave due to movements of the fetal heart. The major difficulty that is associated with the use of such techniques is location of the fetal heart, and also extraneous noise. The noise may be eliminated through the use of a band pass filter or tuned circuit. However, even when once positioned on the abdomen of the mother, movement or shifting of the fetus may result in a loss of signal.

The present invention provides a new and improved transducer arrangement which creates an envelope or volume between the focal points of two sets of transmitting and receiving elements, such that once the transducing arrangement is positioned, movement of the fetus will not result in any loss of signal.

The present invention provides a transducing arrangement utilizing four crystal transducers, two transmitters and two receivers. A first transmitter and a first receiver are so positioned that a focal point is established at a first distance from the transducers. The second transmitter and second receiver are so arranged that the focal point is established at a second distance greater than the first distance. The difference in these focal points creates an area or volume between the two focal points which is adapted to bracket the normal depth of the fetal heart below the abdominal wall. Therefore, once the transducing arrangement is located to detect the fetal heartbeat there is an area or volume between the two focal points of sufficient dimension. Any movement of the fetus will not result in loss of a reflected signal. The transducer is so arranged that all four crystals may be carried in the same mount, electrically and acoustically isolated from each other.

An object of this invention is to provide a new and improved transducing arrangement for detecting and monitoring fetal hearbeat.

Another object of this invention is to provide a transducer of the type described which establishes two focal points for transmitted and reflected ultrasonic energy dimensioned from each other such that the fetal heart will reside between the two focal points when the transducer is positioned on the abdominal wall.

Another object of this invention is to provide a transducer for the purposes described which is simple in construction and relatively economical, and which includes improved means for electrically and acoustically isolating two or more crystals in the same mount.

The features of the invention which are believed to be novel are particularly pointed out and distinctly claimed in the concluding portion of this specification. However, the invention both as to organization and operation, together with further objects and advantages thereof may best be appreciated by reference to the following detailed description taken in conjunction with the drawings, in which:

FIG. 1 is a view of transducing arrangement embodying the invention showing the front surface thereof adapted to be positioned on the abdominal wall;

FIG. 2 is a view seen in the plane of lines 2—2 of FIG. 1;

FIG. 3 is a view of the device of FIG. 1 seen in the plane of lines 3—3 of FIG. 1;

FIG. 4 is an enlarged view of a portion of FIG. 3;

FIG. 5 is a diagram partly in schematic and partly in block form exemplifying the electronics which may be utilized with the transducer; and FIGS. 6a, 6b and 6c are waveform diagrams.

A transducing arrangement 10 embodying the invention comprises a molded or cast plastic housing member 11. Housing 11 defines four planar surfaces 12, 13, 14 and 15, as more clearly shown in FIGS. 2 and 3.

Defined in each of surfaces 12 - 15 is an aperture 16 bounded by an annular recessed shoulder 17.

The surfaces 12 and 14 are disposed at equal angles to the central axis A of the housing, and such angles are chosen to provide a focal point for sonic energy, as hereinafter described. The surfaces 13 and 15 are also disposed at equal angles to the central axis A for the same reasons.

Each of the apertures 16 receives therein on its respective shoulders a window 18 carrying a transducing element 12a - 15a adapted to transmit or receive ultrasonic energy. Each transducer is supported on a window 18 of electrically non-conductive material, such as an acrylic. The windows are then bonded around their peripheries to the shoulders 17, and support thereon in acoustic isolation from housing member 11 each of the transducers.

The outer surfaces of the windows are flush or essentially flush with the respective surfaces 12 - 15. Electrical leads to transducers pass through lower apertures 19 in housing 11.

The windows are selected to have a thickness of an odd one-quarter wave length of the sonic energy transmitted by the transducers so as not to produce reflection at the surfaces. Where the sonic wave is transmitted at two mega herz, the window may have a thickness of 0.040 inches. The layer of adhesive used to bond the transducer to the window is maintained at 0.001 inch maximum. The rate of propagation of the sonic energy is very close to the rate in water, and the combined thickness of the window and adhesive is three-quarter wave length of the transmitted energy. A suitable adhesive is an acrylic base Eastman Kodak 910.

The windows serve to electrically isolate the transducers from the body 11. The body 11, in turn, acoustically isolates the transducers from each other.

The housing 11 is supported in an insulating carrier or mount 11a, as shown in FIG. 3.

The housing 11 is basically a cast epoxy which is filled with metal particles, preferably with tungsten, because of its acoustic properties, fifty percent by weight to a depth of approximately 1/16 to 1/32 inch from the front surface as seen in FIG. 4. This provides an electrically conductive ground surface plane which provides a radio frequency shield. The metal particles act to scatter any sonic energy attempted to be transmitted in housing 11. In casting body 11, the metal filler settles downwardly into the casting and forms the aforementioned ground plane. A ground lead L, which may act as a common ground connection, is cast into body 11.

All of the transducers are piezoelectric crystals tuned to the same frequency. Transducers 12a and 15a are transmitters and their associated receivers are transducers 14a and 13a, respectively. They are preferably of the lead titanate zirconate type bearing the industry designation LTV–2.

Transducers 12a and 15a are excited in series by an oscillator 20 which, for purposes of example, may be a two mega hertz oscillator. The reflected sonic energy received by crystals 13a and 14a, connected in parallel is applied to an r-f amplifier 21 and, hence, to a detector 22. The output of the detector is coupled to a band pass filter or tuned circuit 23 having a frequency response of 100–500 hertz.

The tuned circuit 23 may be coupled to a cardiotachometer 24, preferably of the type shown in U.S. Pat. No. 3,599,628. The output of detector 22 may also be coupled to a speaker or earphones 25.

FIG. 6a depicts an unmodulated transmitted wave such as would be transmitted by the transducers 12a and 15a which are serially excited. If there should be no movement detected, part of this signal will be received in unaltered form (other than amplitude) either as a reflection from the stationary background or due to some coupling from the transmitter. There will be some coupling due to use of an ultrasonic gel between the surface of housing 11 and the skin. However, if movement is now detected within the ultrasonic wave there will be a return signal which is altered in both frequency of phase and amplitude with respect to the transmitted signal due to the Doppler effect of the wave impinging on the moving object. The two signals may be added at different frequencies when received in transducers 13c and/or 14c. Linear addition of the reflected waves (FIG. 6b) shows the effective amplitude modulation as evidenced by the low frequency amplitude envelope in FIG. 6b. These signals are amplified by amplifier 21 and applied to linear detector 22. The output of detector 22 is filtered by band filter 23, discriminating against noise from outside of the band pass range (100–500 hertz). Circuit 23 will then provide a low frequency signal such as shown in FIG. 6c. This signal is applied to the digital cardiotach and a discrete count of the time between each detected heartbeat is made in the cardiotach and a rate signal derived therefrom.

The surfaces 13 and 15 in a housing 11 of approximately two inch diameter are each preferably disposed at an angle of ten degrees to a common horizontal plane perpendicular with the axis A of housing 11. The axes of the transducers are 0.38 inches from the axis A of the housing 11, measured on the horizontal from the surface point of axis A. With these dimensions there will be a focal point of the axes of the transducers 13a and 15a at about five centrimeters from the surfaces of the transducers.

The surfaces 12 and 14 are preferably disposed at angles of about eight and one-half degrees to the horizontal with the axes of the apertures spaced 0.61 inches from axis A measured from the surface point of axis A.

With these dimensions the axes of the transducers 12a and 14a will have a focal point approximately ten centimeters from the surfaces 12 and 14.

The total depth of the housing 11 at the center point thereof is then 0.13 inches. This arrangement provides a generally concave overall surface which may be conveniently positioned on the abdomen with the windows in contact with the abdominal wall. Either receiver may receive reflected energy from either transmitter. The arrangement of the transducers creates a volume or envelope of utrasonic energy between the two focal points which envelops the fetal heart, and which will not lose the presence thereof due to movement of the fetus.

It may thus be seen that the objects of the invention set forth as well as those made apparent from the foregoing disclosure are efficiently attained. Modifications to the disclosed embodiments of the invention as well as other embodiments thereof may occur to others skilled in the art. Accordingly, the appended claims are intended to cover all modifications to the disclosed embodiments as well as other embodiments thereof which do not depart from the spirit and scope of the invention.

What is claimed is:

1. An arrangement adapted to transmit and receive sonic energy comprising a housing member of insulating material having a facing surface, said housing member having a layer of conductive material adjacent and extending over said facing surface; first and second openings defined in said housing member, first and second non-conductive windows closing said openings and having front and rear surfaces, said front surfaces being essentially flush with said facing surface, first and second transducers mounted to the rear surface of said windows and spaced from and out of contact with said housing, means for connecting one of said transducers so that it may to be excited to transmit sonic energy, means for connecting the other of said transducers so that it may receive reflected sonic energy and means for connecting said conductive layer to ground.

2. The arrangement of claim 1 wherein said housing member is cast of an electrical insulating material and said conductive layer comprises a filling of conductive material adjacent said facing surface.

3. An arrangement adapted to transmit and receive ultrasonic energy comprising a housing member having a center line, first and second transducers disposed equidistant on either said of said center and angled with respect to said center line so as to define a focal point a first predetermined distance therefrom substantially on said center line, third and fourth transducers disposed equidistant on either side of said center line between said first and second transducers and angled with respect to said center line so as to define a focal point a second predetermined distance therefrom substantially on said center line, means for connecting one of said first and second and one of said third and fourth transducers to a source of alternating electrical energy whereby said transducers may be excited to transmit sonic energy, means for connecting the other of said transducers so that they may receive reflected sonic energy and convert such received energy to alternating electrical energy, said housing member defining four planar surfaces, first and second of said surfaces defining the angle of said first and second transducers, third and fourth of said surfaces defining the angle of said third and fourth transducers, an opening defined in each of said planar surfaces, windows of electrical insulating material closing said openings and having front and rear surfaces, said front surfaces being substantially flush with said planar surfaces, said transducers bonded to the rear surfaces of said windows and spaced from said housing member to acoustically and electrically isolate said transducers from said housing member.

4. Apparatus for detecting the heart activity of a fetus and adapted to transmit and receive sonic energy comprising a housing member of insulating material having a facing surface adapted to be placed on the abdomen of the fetus carrier, a conductive layer at said facing surface, first and second openings in said housing, first and second window members of non-conductive material having front and rear surfaces, said windows supported on said housing in said openings with the front surfaces thereof substantially flush with said facing surface, first and second transducers mounted to said first and second windows behind said rear surface and physically space from said housing to acoustically and electrically isolate said transducers from said housing, means for connecting one of said transducers so that it may to be electrically excited to transmit sonic energy and means for connecting the other of said transducers so that it may receive reflected sonic energy and convert the received sonic energy to electrical signals and means for connecting said conductive layer to ground.

5. The arrangement of claim 4 where said housing member is cast of an electrical insulating material and filled with a conductor adjacent said facing surface.

6. The arrangement of claim 4 wherein the thickness of said windows is essentially one-quarter of a wave length of the sonic energy transmitted by the transducers.

7. A device adapted to transmit sonic energy into and receive reflected sonic energy from within a living body comprising a non-conductive body member having an outer contacting surface including a conductive layer at the outer surface thereof for providing a low impedance path to ground for radio frequency signals, at least two openings defined in said body member, a recessed shoulder defined about said openings from said surface having said conductive layer, a window member resting on each of said shoulders and having an outer surface essentially flush with said body contacting surface, said window members being of an electrical insulating material different from said body member, a transducer bonded to each of said window members on the inner surface thereof and having a perimeter spaced from the edges of said body member defining said openings to electrically and acoustically isolate said transducer from said body and said conductive layer, means for electrically exciting one of said transducers to transmit sonic energy, and means connecting the other of said transducers to receive sonic energy and convert same to electric energy, and means for connecting said conductive layer to ground.

* * * * *

PO-1050
(5/69)

UNITED STATES PATENT OFFICE
CERTIFICATE OF CORRECTION

Patent No. 3,859,984      Dated January 14, 1975

Inventor(s) Lawrence W. Langley

It is certified that error appears in the above-identified patent and that said Letters Patent are hereby corrected as shown below:

Column 1, line 15, "moinitored" should read --monitored--.
Column 1, line 19, "for" should read --For--.
Column 1, line 58, "hearbeat" should read --heartbeat--.
Column 3, line 39, "of" should read --or--.
Column 3, line 64, "centrimeters" should read --centimeters--.
Claim 4, line 13, "space" should read --spaced--.
Claim 4, line 16, after "may" delete --to--.

Signed and Sealed this twenty-sixth Day of August 1975

[SEAL]

Attest:

RUTH C. MASON
Attesting Officer

C. MARSHALL DANN
Commissioner of Patents and Trademarks